United States Patent
Lee et al.

(10) Patent No.: US 12,160,293 B2
(45) Date of Patent: Dec. 3, 2024

(54) METHOD AND APPARATUS FOR INITIAL ACCESS IN COMMUNICATION SYSTEM

(71) Applicant: ELECTRONICS AND TELECOMMUNICATIONS RESEARCH INSTITUTE, Daejeon (KR)

(72) Inventors: An Seok Lee, Daejeon (KR); Heesoo Lee, Daejeon (KR); Seung Jae Bahng, Daejeon (KR); Jung Sook Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 17/575,596

(22) Filed: Jan. 13, 2022

(65) Prior Publication Data

US 2022/0224386 A1 Jul. 14, 2022

(30) Foreign Application Priority Data

Jan. 13, 2021 (KR) .................. 10-2021-0004906
Jan. 12, 2022 (KR) .................. 10-2022-0004621

(51) Int. Cl.
*H04B 7/06* (2006.01)
*H04B 7/0413* (2017.01)
*H04L 5/00* (2006.01)
*H04L 25/02* (2006.01)

(52) U.S. Cl.
CPC ......... *H04B 7/0617* (2013.01); *H04B 7/0413* (2013.01); *H04L 5/0048* (2013.01); *H04L 25/0224* (2013.01)

(58) Field of Classification Search
CPC .. H04B 7/0413; H04B 7/0608; H04B 7/0617; H04B 7/0691; H04L 5/0048; H04L 5/0057; H04L 5/006; H04L 25/0224
See application file for complete search history.

(56) References Cited

U.S. PATENT DOCUMENTS

| | | | |
|---|---|---|---|
| 9,077,407 B2 | 7/2015 | Koren et al. | |
| 9,219,536 B2 | 12/2015 | Zhou et al. | |
| 10,361,889 B2 | 7/2019 | Kim et al. | |
| 10,659,138 B1 | 5/2020 | Shahmohammadian et al. | |
| 10,720,699 B1 | 7/2020 | Sakamoto et al. | |
| 2015/0236774 A1* | 8/2015 | Son ..................... | H04B 7/0639 375/267 |
| 2017/0162951 A1 | 6/2017 | Lee | |
| 2018/0287683 A1* | 10/2018 | Subramanian ....... | H04B 7/0608 |

(Continued)

FOREIGN PATENT DOCUMENTS

WO 2016003251 A1 1/2016

*Primary Examiner* — David B Lugo
(74) *Attorney, Agent, or Firm* — Rabin & Berdo, P.C.

(57) ABSTRACT

An operation method of a terminal for initial access in a communication system may comprise: receiving a plurality of SSBs having different indexes through a plurality of antennas included in a base station; calculating a channel capacity using the plurality of SSBs; feeding back, to the base station, index(es) of one or more SSBs for having a maximum channel capacity among the plurality of SSBs; and performing communication with the base station through a combination of two or more antennas that have transmitted the one or more SSBs for having the maximum channel capacity among the plurality of antennas.

17 Claims, 20 Drawing Sheets

(56) References Cited

U.S. PATENT DOCUMENTS

| | | | |
|---|---|---|---|
| 2020/0154446 A1* | 5/2020 | Yerramalli | H04L 5/001 |
| 2020/0374725 A1 | 11/2020 | Chen et al. | |
| 2021/0100038 A1* | 4/2021 | Ly | H04L 5/14 |
| 2021/0282224 A1* | 9/2021 | Kanitkar | H04L 43/0888 |
| 2022/0116247 A1* | 4/2022 | Sengupta | H04L 5/0094 |
| 2023/0035996 A1* | 2/2023 | Pefkianakis | H04L 1/0003 |
| 2023/0129005 A1* | 4/2023 | Challita | G01S 5/0244 |
| | | | 701/492 |

* cited by examiner

Two examples of SSB structural changes for assisting a radar function
1. Redesign of PSS/SSS
2. Additional synchronization signal (e.g., tertiary synchronization signal (TSS))

METHOD AND APPARATUS FOR INITIAL ACCESS IN COMMUNICATION SYSTEM

CROSS-REFERENCE TO RELATED APPLICATIONS

This application claims priority to Korean Patent Applications No. 10-2021-0004906 filed on Jan. 13, 2021 and No. 10-2022-0004621 filed on Jan. 12, 2022 with the Korean Intellectual Property Office (KIPO), the entire contents of which are hereby incorporated by reference.

BACKGROUND

1. Technical Field

The present disclosure relates to an initial access technique, and more particularly, to a structure of a signal used for initial access in a communication system, and a technique of transmitting the signal.

2. Related Art

In a new radio (NR) communication network, a beamforming technology may be applied to extend a signal arrival distance of a high frequency band to ensure reliable performance. However, since a position of a terminal cannot be known during an initial access process, synchronization and control signals for initial access may be transmitted in various directions, and a method in which the terminal receiving the synchronization and control signals selects and reports an optimal beam to a base station is being used.

Meanwhile, a communication system for aerial vehicles needs to secure a high transmission rate as well as a communication distance extension through a beamforming technology and spatial multiplexing using multiple antennas or multiple beams. However, since a line of sight (LoS) channel may mainly exist in a channel environment in the communication system for an aerial vehicle having multiple antennas, there may be a problem in that a change in a channel capacity increases according to a relative position of the aerial vehicle with respect to the base station.

SUMMARY

In order to solve the above-identified problems, exemplary embodiments of the present disclosure are directed to providing a method and an apparatus for maximizing a channel capacity when transmitting synchronization signal blocks (SSBs) used for initial access.

According to an exemplary embodiment of the present disclosure for achieving the above-described objective, an operation method of a terminal for initial access in a communication system may comprise: receiving a plurality of synchronization signal blocks (SSBs) having different indexes through a plurality of antennas included in a base station; calculating a channel capacity using the plurality of SSBs; feeding back, to the base station, index(es) of one or more SSBs for having a maximum channel capacity among the plurality of SSBs; and performing communication with the base station through a combination of two or more antennas that have transmitted the one or more SSBs for having the maximum channel capacity among the plurality of antennas.

The receiving of the plurality of SSBs may comprise: receiving, from the base station, control information for controlling a position of the terminal; receiving, from the base station, a first SSB among the plurality of SSBs at a first position moved according to the control information; and receiving, from the base station, a second SSB among the plurality of SSBs at a second position moved according to the control information, wherein the first position is different from the second position.

When the plurality of SSBs are respectively transmitted through the plurality of antennas, the channel capacity may mean a capacity of a channel in which a combination of two or more SSBs among the plurality of SSBs is received.

When the plurality of SSBs are transmitted through a combination of the plurality of antennas, the channel capacity may mean a capacity of a channel through which each of the plurality of SSBs is received.

The calculating of the channel capacity may comprise, when the plurality of SSBs are transmitted through a combination of the plurality of antennas, estimating a channel from a first antenna belonging to the combination of the plurality of antennas to the terminal by using a first multi-stream demodulate reference signal (DMRS) transmitted through the first antenna; and estimating a channel from a second antenna belonging to the combination of the plurality of antennas to the terminal by using a second multi-stream DMRS transmitted through the second antenna, wherein the first multi-stream DMRS is different from the second multi-stream DMRS.

The calculating of the channel capacity may comprise, when the plurality of SSBs are transmitted through a combination of the plurality of antennas, estimating a channel from a first antenna belonging to the combination of the plurality of antennas to the terminal by using a first SSB transmitted in a first frequency band through the first antenna; and estimating a channel from a second antenna belonging to the combination of the plurality of antennas to the terminal by using a second SSB transmitted in a second frequency band through the second antenna, wherein the first frequency band is different from the second frequency band.

The receiving of the plurality of SSBs may comprise: receiving a first SSB among the plurality of SSBs through a first bandwidth part (BWP); and receiving a second SSB among the plurality of SSBs through a second BWP.

According to another exemplary embodiment of the present disclosure for achieving the above-described objective, an operation method of a base station including a plurality of antennas for initial access in a communication system may comprise: transmitting, to a terminal, a plurality of synchronization signal blocks (SSBs) having different indexes through the plurality of antennas; receiving, from the terminal, index(es) of one or more SSBs for having a maximum channel capacity among the plurality of SSBs; and performing communication with the terminal through a combination of two or more antennas that have transmitted the one or more SSBs for having the maximum channel capacity among the plurality of antennas.

The transmitting of the plurality of SSBs may comprise transmitting, to the terminal, control information for controlling a position of the terminal.

The plurality of SSBs may be respectively transmitted through the plurality of antennas.

A first SSB among the plurality of SSBs may be transmitted through a first combination of the plurality of antennas, a second SSB among the plurality of SSBs may be transmitted through a second combination of the plurality of antennas, and the first combination and the second combination may be configured with different antennas.

The plurality of antennas may be a plurality of virtual antennas, a first SSB among the plurality of SSBs may be transmitted through a first combination of the plurality of virtual antennas, a second SSB among the plurality of SSBs may be transmitted through a second combination of the plurality of virtual antennas, the first combination and the second combination may be configured with different virtual antennas, the first SSB may be transmitted using a first beam according to beamforming, and the second SSB may be transmitted using a second beam.

A first bandwidth part (BWP) may be allocated for a first beam according to beamforming, a second BWP may be allocated for a second beam, a first SSB among the plurality of SSBs may be transmitted in the first BWP using the first beam, and a second SSB among the plurality of SSBs may be transmitted in the second BWP using the second beam.

In the transmitting of the plurality of SSBs comprises, when the plurality of SSBs are transmitted through a combination of the plurality of antennas, transmitting a first SSB including a first multi-stream demodulate reference signal (DMRS) through a first antenna belonging to the combination of the plurality of antennas, and transmitting a second SSB including a second multi-stream DMRS through a second antenna belonging to the combination of the plurality of antennas, wherein the first multi-stream DMRS may be different from the second multi-stream DMRS.

In the transmitting of the plurality of SSBs comprises, when the plurality of SSBs are transmitted through a combination of the plurality of antennas, transmitting a first SSB in a first frequency band through a first antenna belonging to the combination of the plurality of antennas, and transmitting a second SSB in a second frequency band through a second antenna belonging to the combination of the plurality of antennas, wherein the first frequency band may be different from the second frequency band.

According to yet another exemplary embodiment of the present disclosure for achieving the above-described objective, a base station including a plurality of antennas in a communication system may comprise: a processor; a memory electronically communicating with the processor; and instructions stored in the memory, wherein when executed by the processor, the instructions cause the base station to: transmit, to a terminal, a plurality of synchronization signal blocks (SSBs) having different indexes through the plurality of antennas; receive, from the terminal, index (es) of one or more SSBs for having a maximum channel capacity among the plurality of SSBs; and perform communication with the terminal through a combination of two or more antennas that have transmitted the one or more SSBs for having the maximum channel capacity among the plurality of antennas.

In the transmitting of the plurality of SSBs, the instructions may cause the base station to transmit, to the terminal, control information for controlling a position of the terminal.

The plurality of SSBs may be respectively transmitted through the plurality of antennas.

A first SSB among the plurality of SSBs may be transmitted through a first combination of the plurality of antennas, a second SSB among the plurality of SSBs may be transmitted through a second combination of the plurality of antennas, and the first combination and the second combination may be configured with different antennas.

The plurality of antennas may be a plurality of virtual antennas, a first SSB among the plurality of SSBs may be transmitted through a first combination of the plurality of virtual antennas, a second SSB among the plurality of SSBs may be transmitted through a second combination of the plurality of virtual antennas, the first combination and the second combination may be configured with different virtual antennas, the first SSB may be transmitted using a first beam according to beamforming, and the second SSB may be transmitted using a second beam.

According to the exemplary embodiments of the present disclosure, a LoS-multiple input multiple output (LoS-MIMO) channel capacity of the communication system for aerial vehicles can be maximized. In addition, the base station may track the positions and movement paths of the terminal. Through this, the base station can improve the communication quality by maximizing the channel capacity despite a large change in the channel capacity due to the relative positional movements of the terminal.

DETAILED DESCRIPTION OF THE EMBODIMENTS

Figure 1:
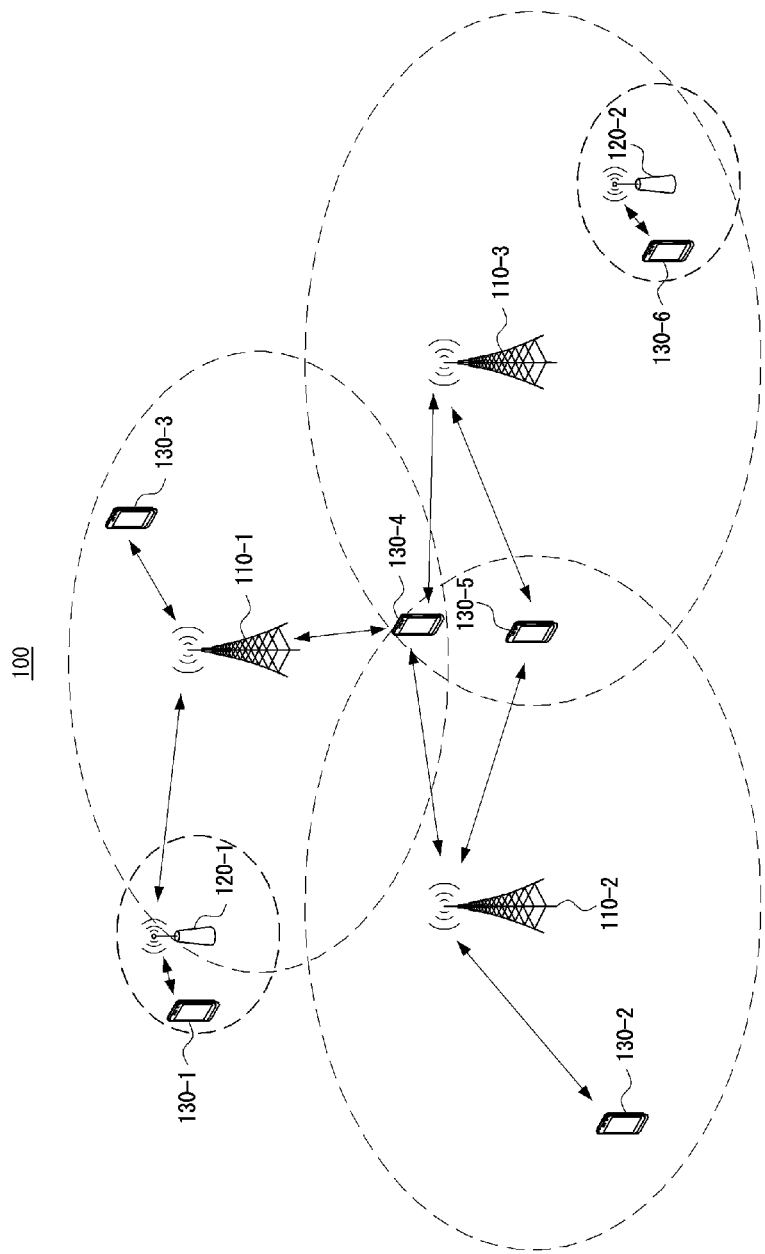
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support $4^{th}$ generation (4G) communication (e.g., long term evolution (LTE), LTE-advanced (LTE-A)), $5^{th}$ generation (5G) communication (e.g., new radio (NR)), or the like. The 4G communication may be performed in a frequency band of 6 GHz or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
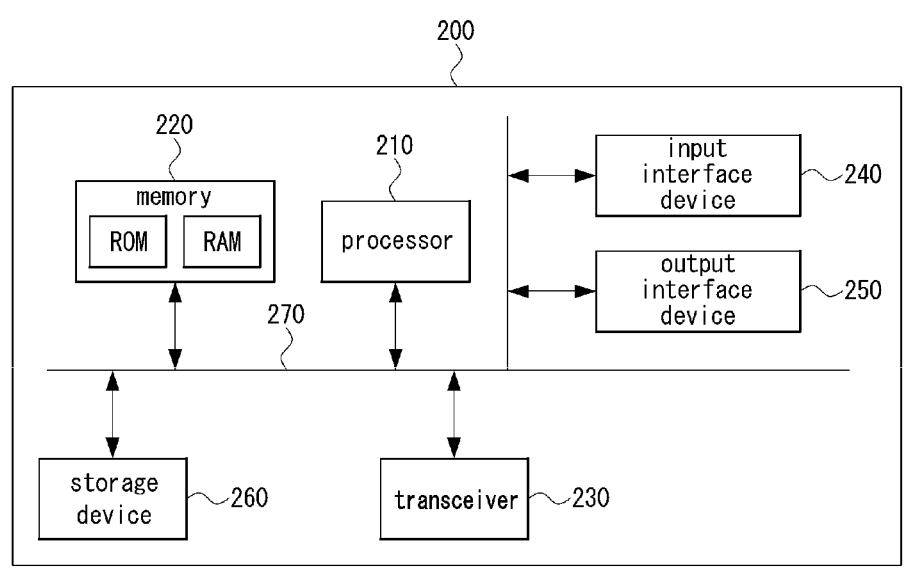
FIG. 2 is a block diagram illustrating a first exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, evolved Node-B (eNB), base transceiver station (BTS), radio base station, radio transceiver, access point, access node, road side unit (RSU), radio remote head (RRH), transmission point (TP), transmission and reception point (TRP), eNB, gNB, or the like.

Here, each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of things (IoT) device, mounted apparatus (e.g., a mounted module/device/terminal or an on-board device/terminal, etc.), or the like.

Hereinafter, methods for initial access in a communication network including an aerial vehicle will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

In order to increase a wireless transmission capacity, a communication network (e.g., NR communication network) may use a high frequency band such as in millimeter wave (mmWave) and terahertz (THz) communications, taking into account the absence of available low frequency bands, increase in the amount of transmission traffic and in mobile devices, and the like. In a millimeter wave or terahertz communication system, since attenuation of a reflected wave reflected by scattering may be increased according to a characteristic of a frequency band used, a line of sight (LoS) component may be dominant. In case of a LoS communication environment in which a direct wave is very dominant compared to a reflected wave, it may be difficult to achieve a high transmission capacity as in the existing multiple input multiple output (MIMO) communication. That is, a change in the achievable channel capacity due to a distance between transmitting and receiving ends and antenna structures thereof may be large.

It may be required to increase a transmission capacity when the distance between the transmitting and receiving ends is dynamically changed due to a change in altitude and distance, such as in an aerial vehicle. Accordingly, in exemplary embodiments according to the present disclosure, a LoS-MIMO communication system may change its antenna structure even though a position of a base station is fixed, and maximize the channel capacity by adjusting a height, distance or angle of a terminal. In addition, in the exemplary embodiments below, a terminal may mean a mobile terminal (e.g., aerial vehicle) located in a non-terrestrial environment.

[Synchronization Signal Block (SSB) Structure in NR]

Figure 3:
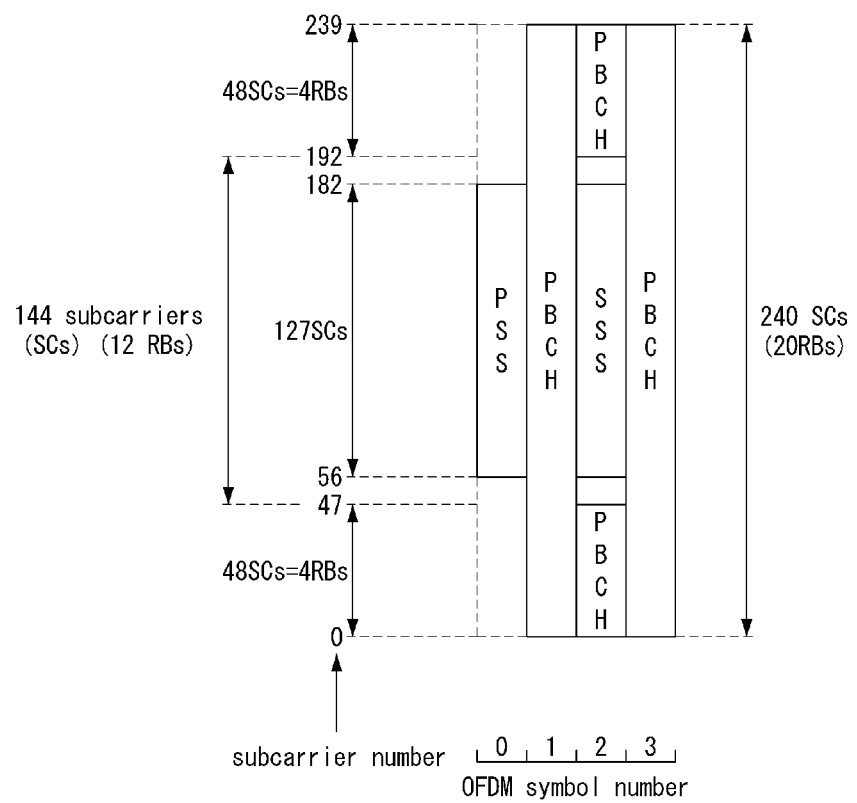
FIG. 3 is a conceptual diagram illustrating a structure of an SSB.

FIG. 3 is a conceptual diagram illustrating a structure of an SSB.

Referring to FIG. 3, in the NR communication system, a base station may periodically transmit SSB(s) to terminal(s) in order to synchronize with the terminal(s) and transmit basic system information for initial access to the terminal(s). The SSB may include a primary synchronization signal (PSS), a secondary synchronization signal (SSS), a physical broadcast channel (PBCH) for broadcasting information such as a master information block (MIB), and a PBCH demodulate reference signal (DMRS) for decoding the PBCH.

The terminal may synchronize in time-frequency with the base station through synchronization, and may receive the MIB from the base station through the PBCH. Accordingly, the terminal may detect the SSB in the synchronization procedure, and may start an initial access procedure by decoding the detected SSB.

Figure 4:
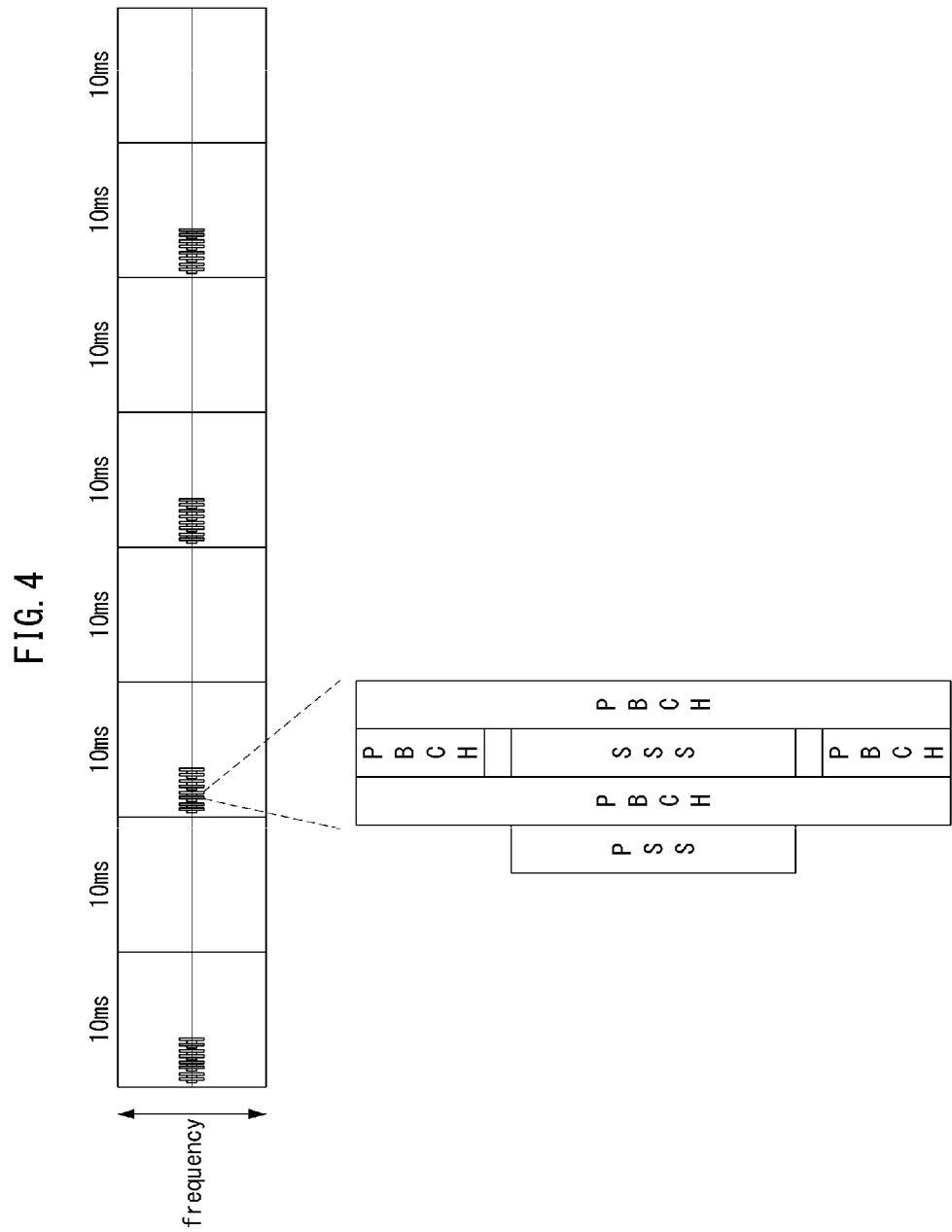
FIG. 4 is a conceptual diagram illustrating a form in which SSB(s) are periodically transmitted in an NR frame.

FIG. 4 is a conceptual diagram illustrating a form in which SSB(s) are periodically transmitted in an NR frame.

Referring to FIG. 4, the SSB(s) may be periodically transmitted in specific subcarriers of an orthogonal frequency division multiplexing (OFDM) frame of the NR communication system. In the SSB, the synchronization signals (e.g., PSS and SSS) and the PBCH may not be separated from each other in the time domain, and their positions in the time-frequency domain may vary depending on a subcarrier spacing (SCS) and a case.

First Exemplary Embodiment of Antenna Combination Selection Method

Figure 5:
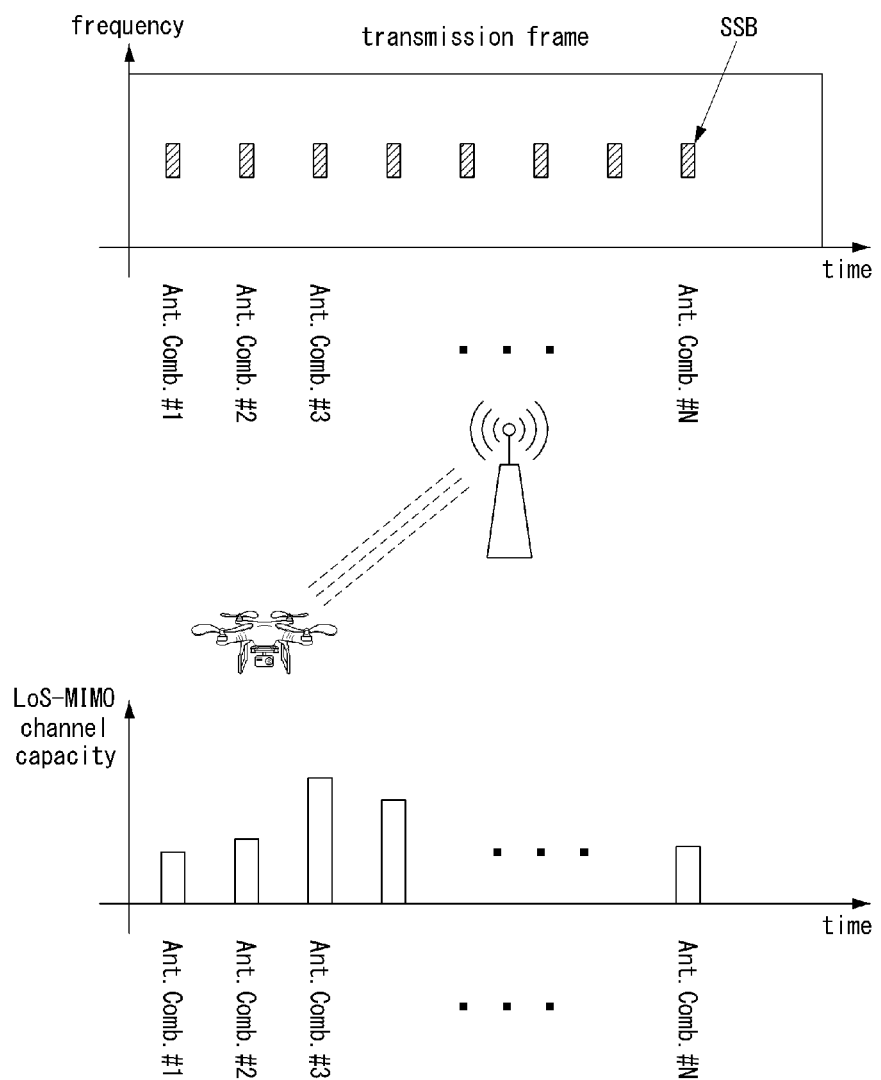
FIG. 5 is a conceptual diagram illustrating a first exemplary embodiment of a method for selecting an optimal antenna combination.

FIG. 5 is a conceptual diagram illustrating a first exemplary embodiment of a method for selecting an optimal antenna combination.

Referring to FIG. 5, assuming that the number of antennas is greater than the number of radio frequency (RF) chains in a transmitting end, in order to determine an optimal antenna combination, the base station may select a different antenna combination (e.g., Ant.Comb. #1, Ant.Comb. #2, . . . , Ant.Comb. #N) each time it transmits an SSB to the terminal.

Figure 6:
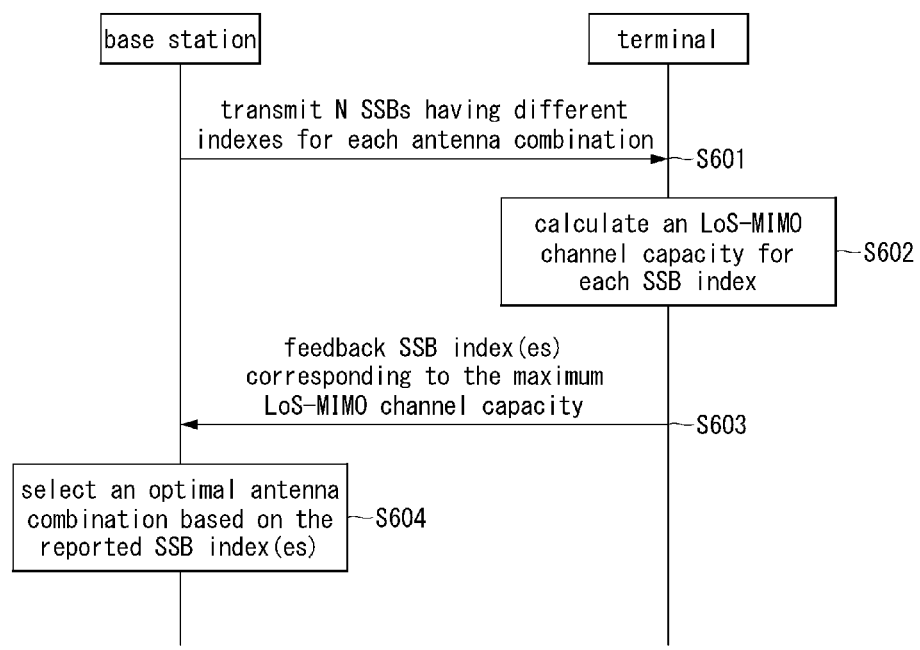
FIG. 6 is a sequence chart illustrating a first exemplary embodiment of a method for selecting an optimal antenna combination.

FIG. 6 is a sequence chart illustrating a first exemplary embodiment of a method for selecting an optimal antenna combination.

Referring to FIG. 6, the base station may transmit, to the terminal, N SSBs having different indexes for each of different antenna combinations among a plurality of antennas (S601). The terminal may receive the N SSBs having different indexes from the base station. The terminal may calculate a LoS-MIMO channel capacity for each SSB index (S602). The terminal may report SSB index(es) corresponding to the maximum LoS-MIMO channel capacity to the base station (S603). The base station may receive the SSB index(es) corresponding to the maximum LoS-MIMO channel capacity from the terminal, and may select an optimal antenna combination based on the reported SSB index(es) (S604). However, since a DMRS included in the existing SSB is suitable for single-stream or single-layer signal transmission, the SSB in the exemplary embodiments may include a DMRS used for multi-stream data transmission.

Figure 7:
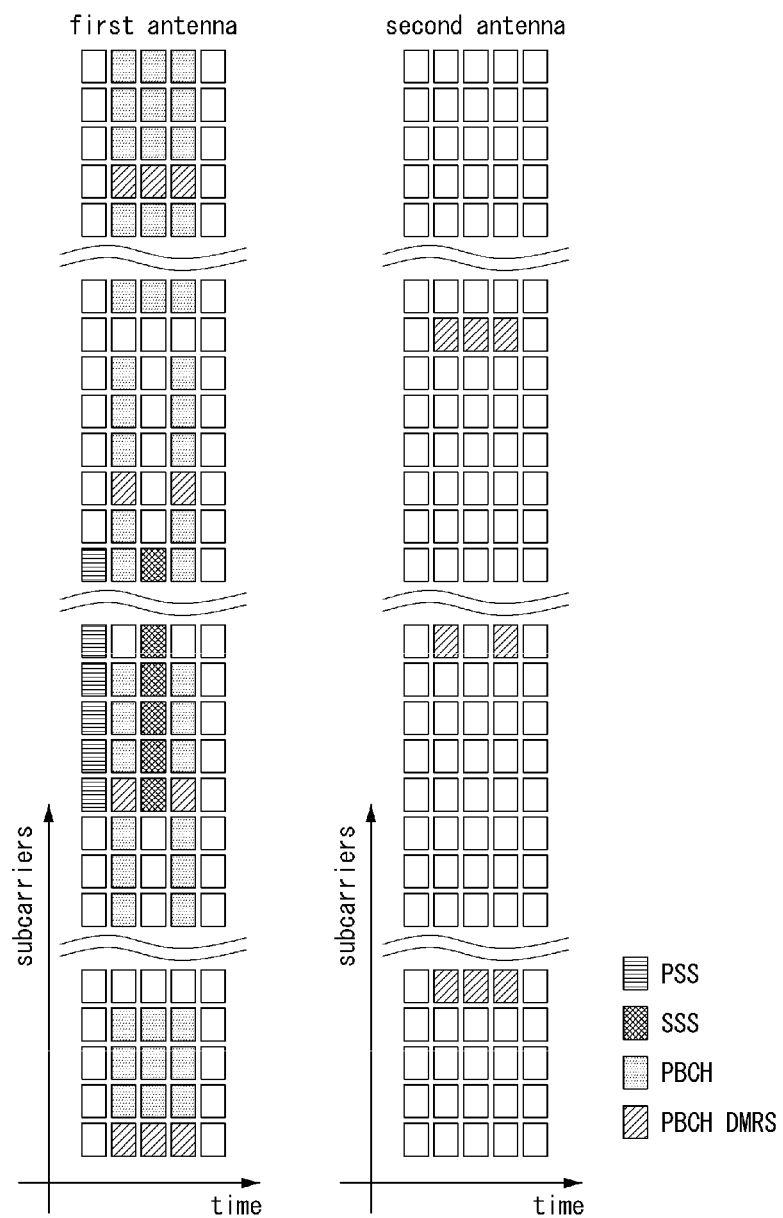
FIG. 7 is a conceptual diagram illustrating a first exemplary embodiment of a PBCH DMRS transmission method for channel estimation.

FIG. 7 is a conceptual diagram illustrating a first exemplary embodiment of a PBCH DMRS transmission method for channel estimation.

Referring to FIG. 7, in the LoS channel environment, a PBCH DMRS may be sparsely allocated in the frequency domain. For example, when the base station includes two antennas, the base station may map the first PBCH DMRS transmitted through the first antenna (e.g., the first antenna port) and the second PBCH DMRS transmitted through the second antenna port (e.g., the second antenna port) to different subcarriers for channel estimation for the MIMO channel.

The base station may transmit a first PBCH DMRS through a first antenna and a second PBCH DMRS through a second antenna. The terminal may receive the first PBCH DMRS from the base station, and may estimate a channel from the first antenna to the terminal using the first PBCH DMRS. In addition, the terminal may receive the second PBCH DMRS from the base station, and may estimate a channel from the second antenna to the terminal using the second PBCH DMRS. Accordingly, the terminal may estimate the entire MIMO channel.

Figure 8:
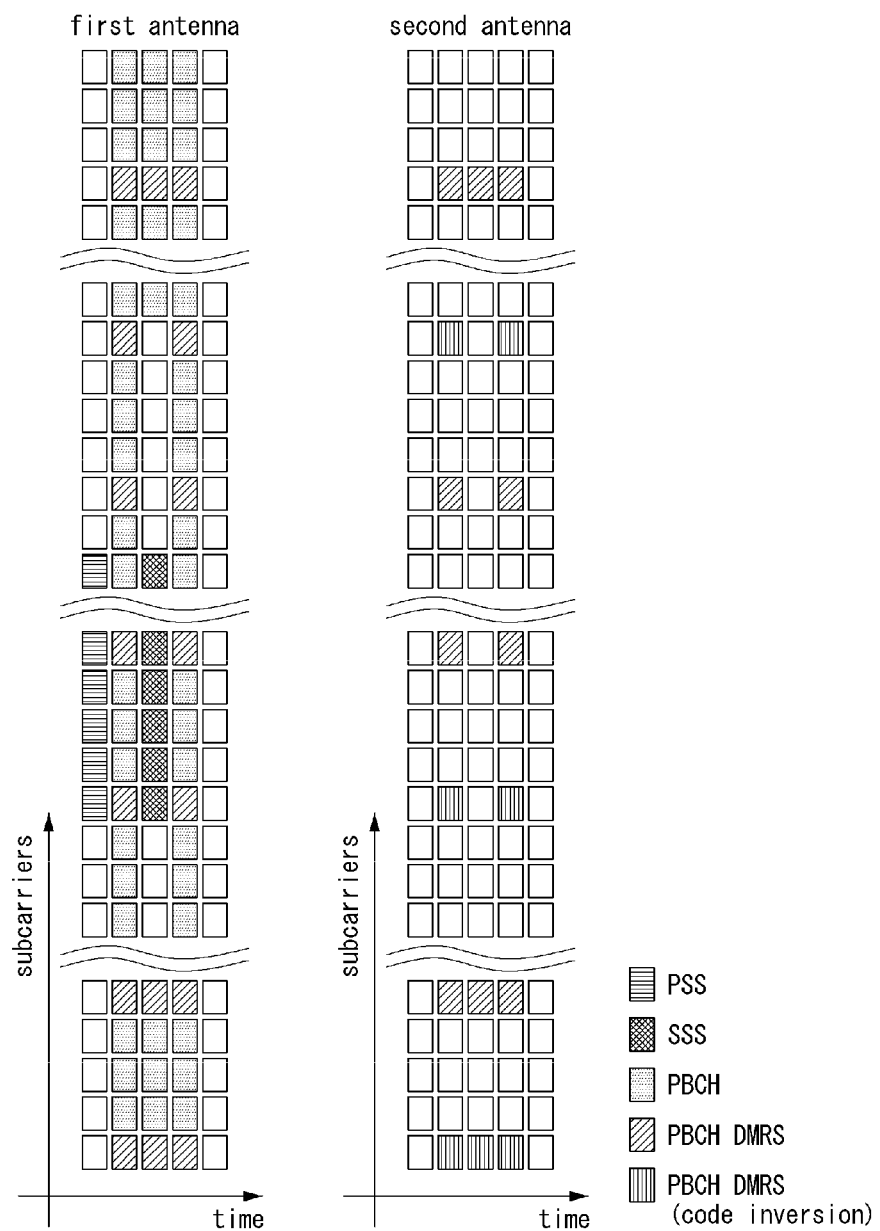
FIG. 8 is a conceptual diagram illustrating a second exemplary embodiment of a PBCH DMRS transmission method for channel estimation.

FIG. 8 is a conceptual diagram illustrating a second exemplary embodiment of a PBCH DMRS transmission method for channel estimation.

Referring to FIG. 8, an orthogonal coding scheme in the frequency domain may be used. For example, the base station may transmit first PBCH DMRSs having a code of a form [1 1] to the terminal through the first antenna. The base station may transmit second PBCH DMRSs having a code of a form [1 −1] to the terminal by inverting a code of the first PBCH DMRS through the second antenna. The terminal may estimate a channel from the first antenna to the terminal by adding the PBCH DMRSs received through the first and second antennas. The terminal may estimate a channel from the second antenna to the terminal based on a difference between the PBCH DMRSs received through the first and second antennas. Accordingly, the terminal may estimate the entire MIMO channel.

In another exemplary embodiment, the base station may transmit a plurality of PBCH DMRSs using an orthogonal coding scheme in the time domain.

Second Exemplary Embodiment of Antenna Combination Selection Method

Figure 9:
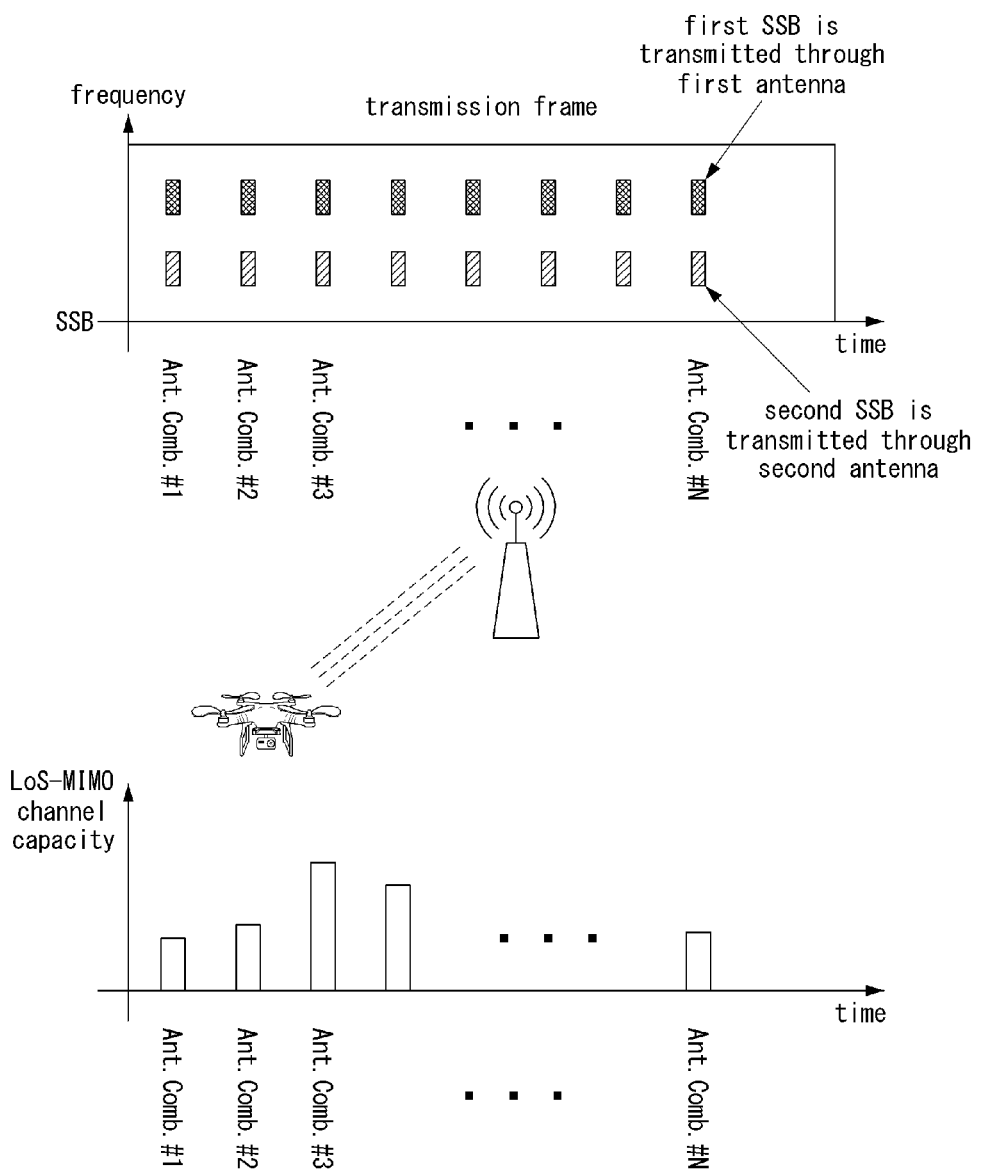
FIG. 9 is a conceptual diagram illustrating a second exemplary embodiment of a method for selecting an optimal antenna combination.

FIG. 9 is a conceptual diagram illustrating a second exemplary embodiment of a method for selecting an optimal antenna combination.

Referring to FIG. 9, the base station may transmit SSBs as many as the number of antennas selected for each of N antenna combinations in a plurality of frequency bands, thereby allowing the terminal to calculate a channel capacity of the MIMO channel without modifying the PBCH DMRS. The base station may transmit different SSBs as many as the number of antennas selected for each antenna combination in different frequency bands.

For example, when the number of antennas selected for each antenna combination (e.g., Ant.Comb. #1 to Ant.Comb. #N) is two, two SSBs may be transmitted in two different frequency bands. The base station may transmit a first SSB to the terminal in a first frequency band through a first antenna. The base station may transmit a second SSB to the terminal in a second frequency band through a second antenna. The terminal may receive the first SSB from the base station in the first frequency band. The terminal may receive the second SSB from the base station in the second frequency band. The terminal may estimate a channel from the first antenna to the terminal and a channel from the second antenna to the terminal. Accordingly, the terminal may estimate the channel for the entire MIMO channel and calculate a channel capacity. However, such the exemplary embodiment may be applied because the channel between the base station and the terminal is a LoS channel, and a change in the channel according to frequency is small. Therefore, in the case of a non-LoS channel, the base station may transmit two SSBs in close frequency bands to minimize the change in the channel according to frequency.

Third Exemplary Embodiment of Antenna Combination Selection Method

Figure 10:
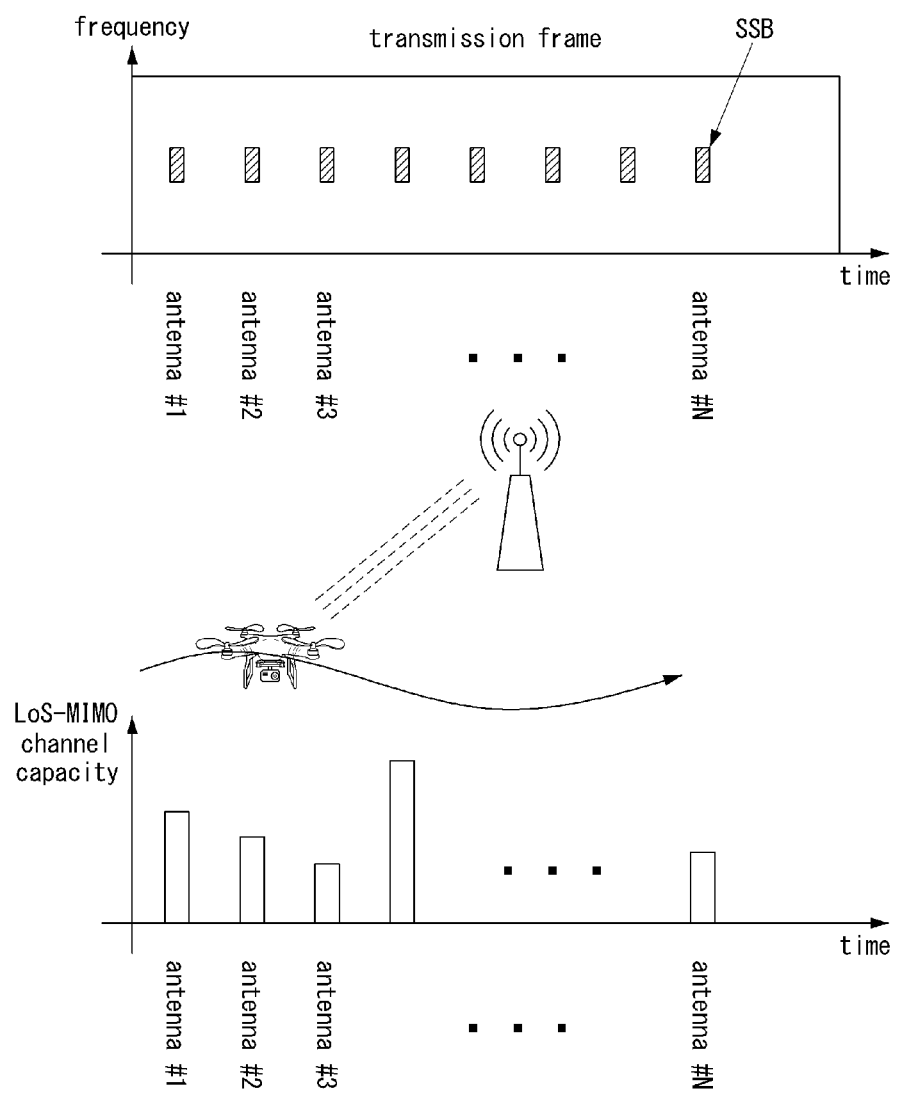
FIG. 10 is a conceptual diagram illustrating a third exemplary embodiment of a method for selecting an optimal antenna combination.

FIG. 10 is a conceptual diagram illustrating a third exemplary embodiment of a method for selecting an optimal antenna combination.

Referring to FIG. 10, in the above-described channel capacity expansion method using an antenna combination, the number of possible antenna combinations may increase exponentially according to the total number of antennas and the number of RF chains. Therefore, when the number of SSB indexes increases, a delay may occur in the process for the terminal to determine an optimal antenna combination for initial access. Therefore, when the base station transmits SSB(s) for each antenna to the terminal to solve the above-described problem of delay, the terminal may calculate a LoS-MIMO channel capacity according to an antenna combination.

Figure 11:
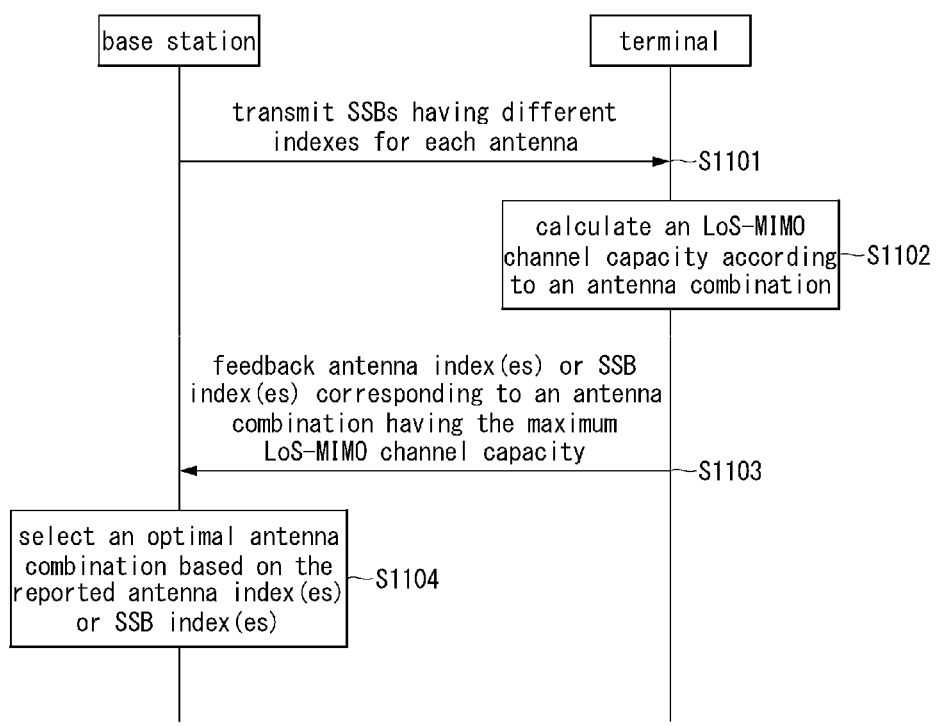
FIG. 11 is a sequence chart illustrating a third exemplary embodiment of a method for selecting an optimal antenna combination.

FIG. 11 is a sequence chart illustrating a third exemplary embodiment of a method for selecting an optimal antenna combination.

Referring to FIG. 11, the base station may consider a method of transmitting SSB(s) for each antenna instead of transmitting SSB(s) according to an antenna combination. When the total number of antennas is N, the base station may transmit N SSBs having different indexes for each antenna to the terminal (S1101). The terminal may receive the N SSBs having different indexes from the base station. The terminal may calculate a LoS-MIMO channel capacity according to an antenna combination (S1102).

The terminal may report one or more antenna indexes corresponding to an antenna combination having the maximum LoS-MIMO channel capacity to the base station. The base station may receive the one or more antenna indexes corresponding to the maximum LoS-MIMO channel capacity from the terminal. Alternatively, the terminal may feedback one or more SSB indexes corresponding to the antenna combination having the maximum LoS-MIMO channel capacity to the base station (S1103). The base station may receive the one or more SSB indexes corresponding to the maximum LoS-MIMO channel capacity from the terminal. The base station may select an optimal antenna combination according to the reported values (e.g., one or more antenna indexes or SSB indexes) (S1104).

When the terminal knows the antenna structure of the base station, the base station may reduce the number of SSBs transmitted periodically. In more detail, when the antenna structure of the base station is a linear array antenna, and the terminal knows a spacing of antenna elements and the number of the antenna elements in advance, the terminal may estimate a distance between an antenna element of the plurality of antenna elements and the antenna of the terminal based on a distance between the antenna of the terminal and each of the first and last antenna element among the plurality of antenna elements of the base station. The terminal may use a linear interpolation method to estimate a distance between an antenna element among the plurality of antenna elements of the base station and the antenna of the terminal.

Alternatively, the terminal may estimate LoS channel phase information according to a distance between the antenna of the terminal and an antenna element of the plurality of antenna elements of the base station based on LoS channel phase information according to the distance between the antenna of the terminal and each of the first and last antenna element among the plurality of antenna elements of the base station. The terminal may use a linear interpolation method to estimate the LoS channel phase information according to the distance between an antenna element among the plurality of antenna elements of the base station and the antenna of the terminal.

Accordingly, the base station may reduce the number of SSBs periodically transmitted when the terminal estimates the distance information or LoS channel phase information between an antenna element among the plurality of antenna elements of the base station and the antenna of the terminal.

[Method for Finding an Optimal Position of a Terminal]

Figure 12:
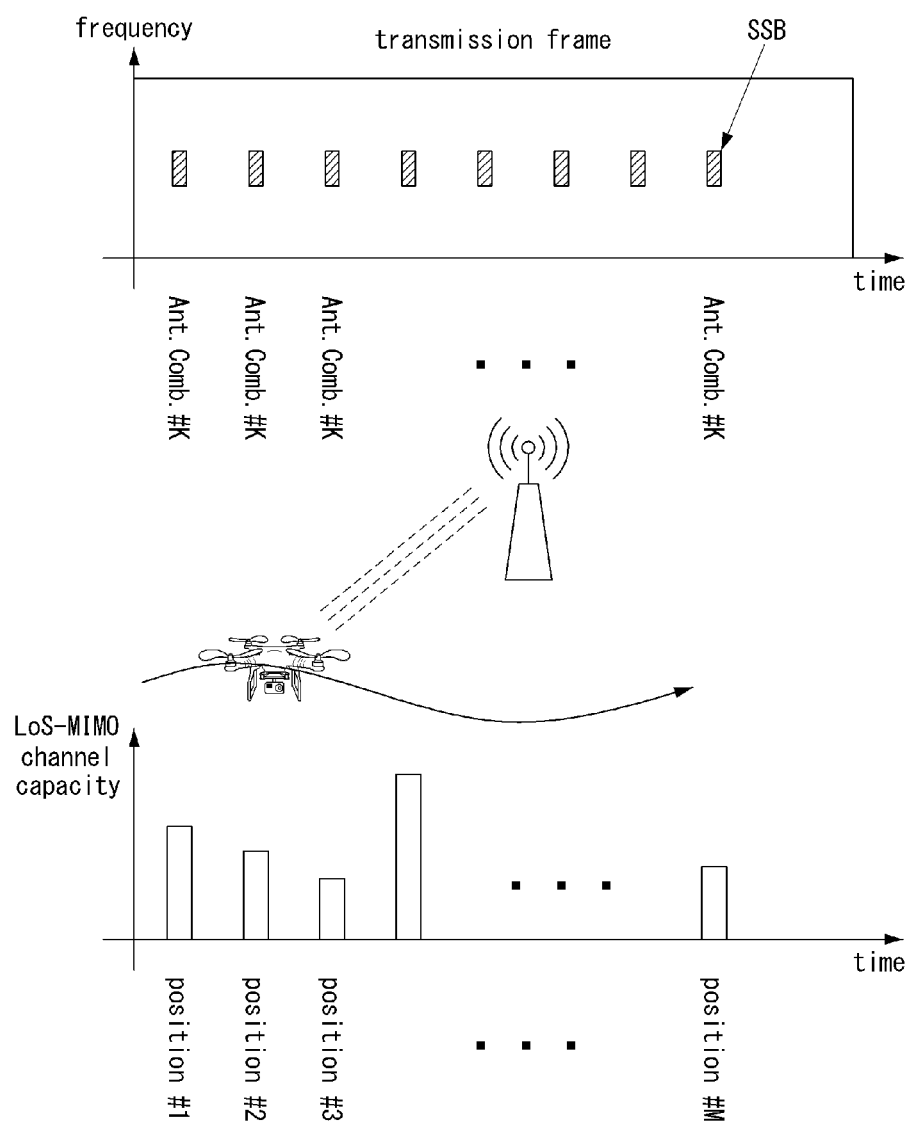
FIG. 12 is a conceptual diagram illustrating an exemplary embodiment of a method for finding an optimal position of a terminal.

FIG. 12 is a conceptual diagram illustrating an exemplary embodiment of a method for finding an optimal position of a terminal.

Referring to FIG. 12, after the base station selects an optimal antenna combination (e.g., Ant.Comb. #K), the LoS-MIMO channel capacity may change according to a position of the terminal. Accordingly, the terminal may maximize the LoS-MIMO channel capacity by receiving a signal from the base station at an optimal position while changing its position.

[Method of Finding an Optimal Position of a Terminal in Relay Communication Using the Terminal]

Figure 13:
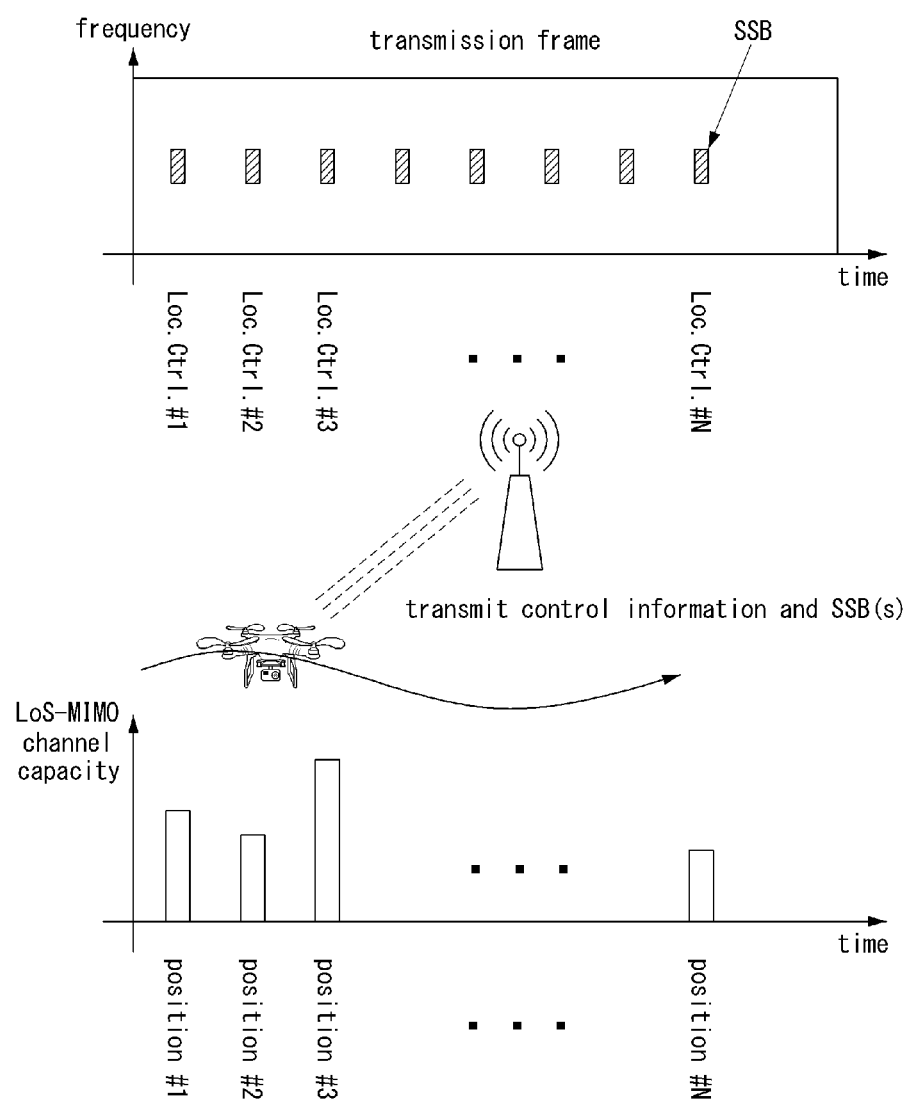
FIG. 13 is a conceptual diagram illustrating an exemplary embodiment of a communication method through a relay of a terminal.

FIG. 13 is a conceptual diagram illustrating an exemplary embodiment of a communication method through a relay of a terminal.

Referring to FIG. 13, according to a scenario, the base station may perform communication through a relay of the terminal. In an exemplary embodiment, the base station may periodically transmit, to the terminal performing the relay operations, control information and communication data (e.g., SSB) including information for controlling the position of the terminal. The base station may directly control the position of the terminal, and the terminal may report a LoS-MIMO channel capacity calculated at each position moved according to the control information to the base station. Accordingly, the base station may know a position of the terminal having the maximum LoS-MIMO channel capacity.

Figure 14:
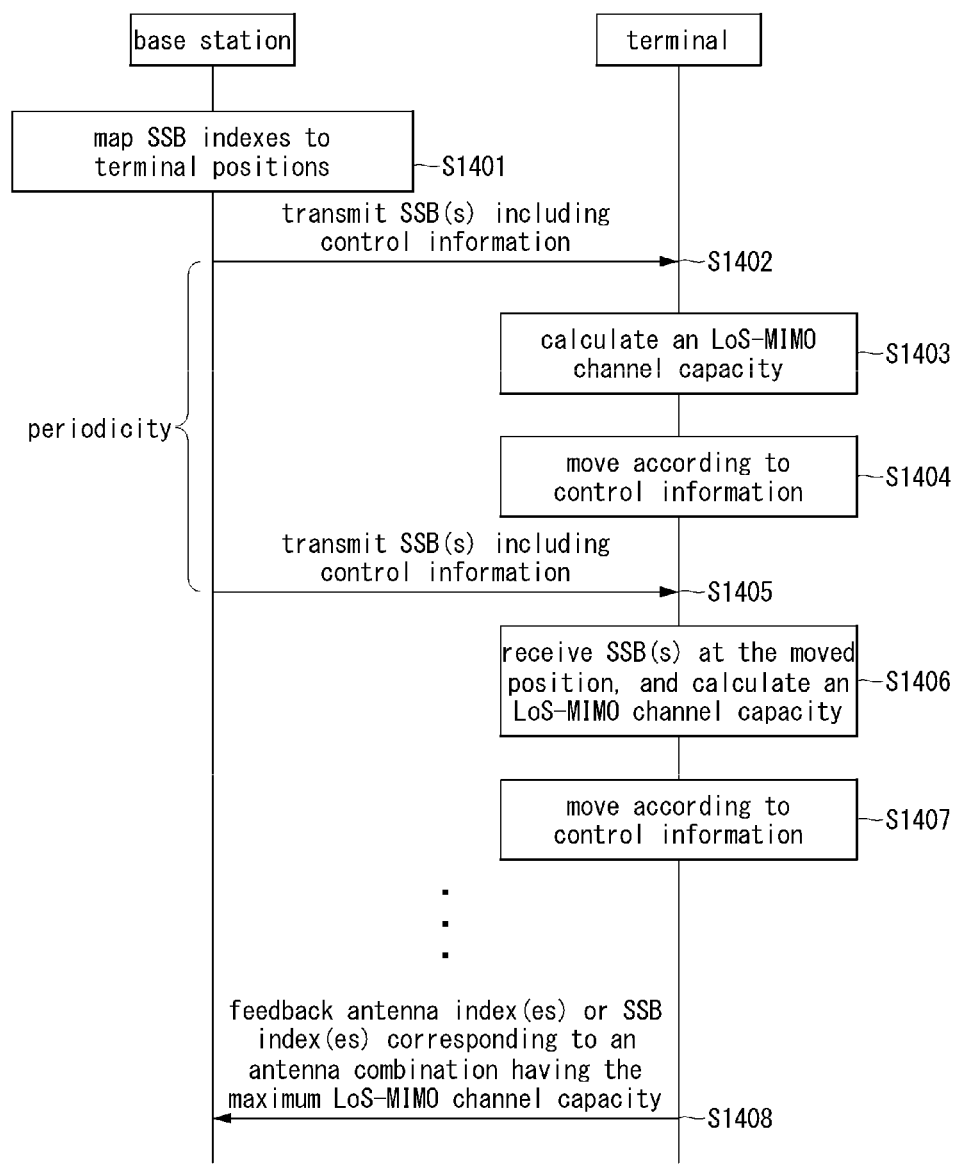
FIG. 14 is a sequence chart illustrating an exemplary embodiment of a communication method through a relay of a terminal.

FIG. 14 is a sequence chart illustrating an exemplary embodiment of a communication method through a relay of a terminal.

Referring to FIG. 14, in an exemplary embodiment, the base station may map SSB indexes to the positions (e.g., Loc.Ctrl. #1 to Loc.Ctrl. #N) of the terminal (S1401). The base station may transmit control information (e.g., Loc.Ctrl #1) and an SSB to the terminal (S1402). The control information may include mapping information between an SSB index and a position of the terminal. The terminal may receive the control information (e.g., Loc.Ctrl #1) and the SSB from the base station, and may calculate a LoS-MIMO channel capacity (S1403). Then, the terminal may move to the position mapped to the SSB index received from the base station (S1404). The steps S1402 to S1404 described above may be periodically repeated during one SSB burst.

The base station may transmit control information (e.g., Loc.Ctrl #2) and an SSB to the terminal (S1405). The terminal may receive the control information (e.g., Loc.Ctrl #2) and the SSB from the base station at the moved position, and may calculate a LoS-MIMO channel capacity (S1406). Then, the terminal may move to the position mapped to the index of the SSB received from the base station (S1407). The terminal may report an SSB index corresponding to a position having the maximum LoS-MIMO channel capacity to the base station during one SSB burst (S1408).

In another exemplary embodiment, the base station may map the SSB indexes and the positions of the terminal in consideration of a delay time during which the terminal receives the position control information and moves to the corresponding position.

[Application of Analog Beamforming and Antenna Combination Selection Method]

In a millimeter wave or terahertz communication system, an analog beamforming technique using an array gain may be applied to extend a transmission distance. That is, in the millimeter wave or terahertz communication system, an output of one RF chain may be connected to a plurality of antenna elements through phase shifters, and a beam may be formed in a desired direction by adjusting a phase of each antenna path. Even when the analog beamforming is applied, the above-described antenna selection methods may be applied.

Figure 15:
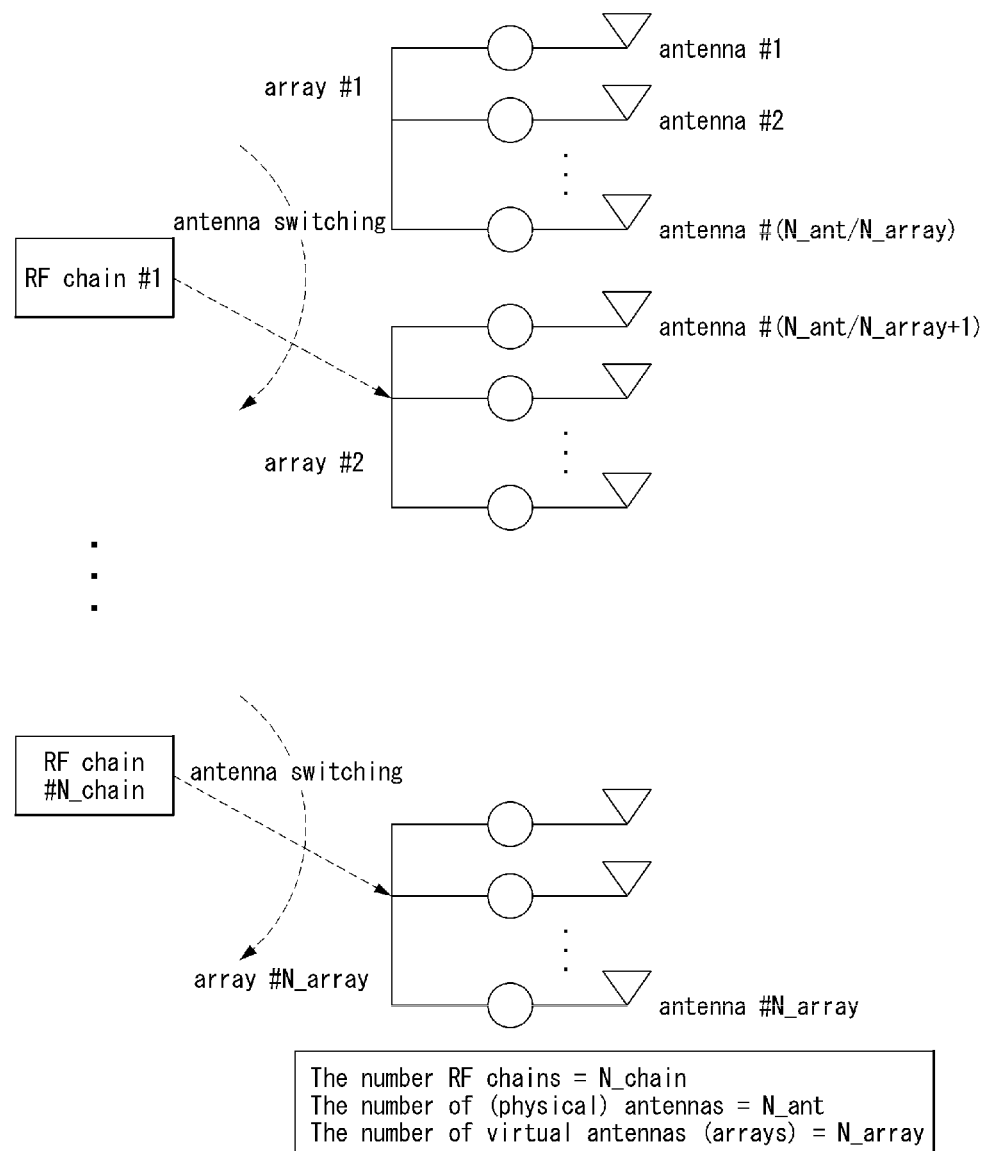
FIG. 15 is a conceptual diagram illustrating an analog beamforming method.

FIG. 15 is a conceptual diagram illustrating an analog beamforming method.

Referring to FIG. 15, a communication system to which analog beamforming is applied may include N_ant physical antennas, and the N_ant physical antennas may form N_array antenna groups. Accordingly, one antenna group may include (N_ant/N_array) physical antennas. An analog array antenna to which as many phase shifters as the number of antennas belonging to one group (i.e., N_ant/N_array) may serve as one virtual antenna. All virtual antennas may form beams in the same direction. Accordingly, a total of N_array antenna groups may look like N_array transmission antennas. The N_ant physical antennas may configure N_array virtual antennas. Signals transmitted from the virtual antennas may be received by N_rx reception antennas to configure a LoS-MIMO channel of N_rx×N_array. The reception antennas may be N_rx virtual antennas or N_rx physical antennas.

In order to transmit SSB(s) to the terminal by using the N_array virtual antennas, the terminal may apply one of the method of transmitting SSB(s) for each combination of N_array virtual antennas (i.e., the first exemplary embodiment of the antenna combination selection method), the method of transmitting SSB(s) for each virtual antenna (i.e., the third exemplary embodiment of the antenna combination selection method), or the method of transmitting SSB(s) by using only some virtual antennas.

In the method of transmitting the SSB(s) using only some virtual antennas, the base station may select a part of the N_array virtual antennas, and configure transmission antennas in a form in which N chain RF chains are connected to the selected virtual antennas. For example, the base station may select virtual antenna(s) corresponding to arrays #1 and #2 from among the N_array virtual antennas, and connect the selected virtual antenna(s) to an RF chain #1. The RF chain #1 may be connected to only one virtual antenna of the arrays #1 and #2, and the RF chain #1 may switch an antenna to connect to one virtual antenna.

[SSB Transmission Method for Supporting Analog Beamforming and Antenna Combination Selection Method]

Figure 16:
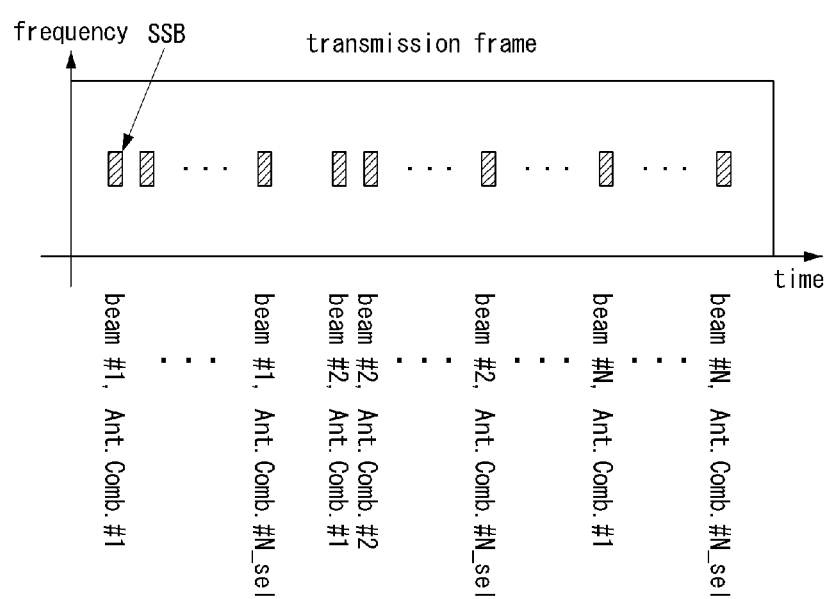
FIG. 16 is a conceptual diagram illustrating a first exemplary embodiment of an SSB transmission method for supporting the analog beamforming and the antenna combination selection method.

FIG. 16 is a conceptual diagram illustrating a first exemplary embodiment of an SSB transmission method for supporting the analog beamforming and the antenna combination selection method.

Referring to FIG. 16, a communication system to which the analog beamforming and the antenna selection method are applied may require an SSB transmission method for simultaneously supporting the analog beamforming and the antenna selection method.

Accordingly, the base station may change SSB transmission configuration used for initial access. The base station may transmit SSB(s) as many as a product of the number N of transmission beam directions and the number N_sel of virtual antenna combinations at different times within one SSB burst. That is, the base station may transmit the SSB(s) for each combination of virtual antennas for each transmission beam direction (i.e., application of the first exemplary embodiment of the antenna combination selection method).

In a second exemplary embodiment of the SSB transmission method for supporting the analog beamforming and antenna combination selection method, the base station may transmit SSB(s) for each virtual antenna for each transmission beam direction (i.e., the application of the third exemplary embodiment of the antenna combination selection method).

In a third exemplary embodiment of the SSB transmission method for supporting the analog beamforming and antenna combination selection method, the base station may transmit SSB(s) using a part of the virtual antennas.

Figure 17:
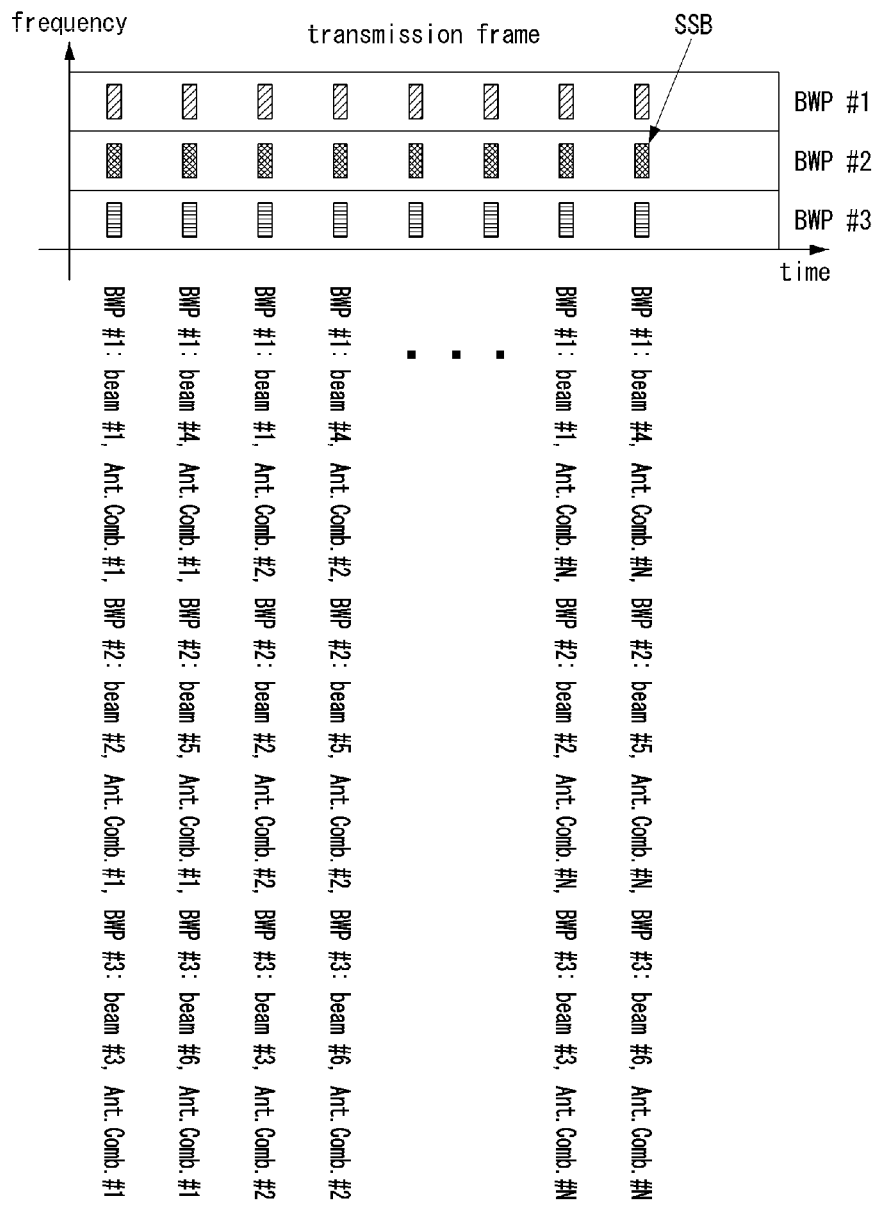
FIG. 17 is a conceptual diagram illustrating a fourth exemplary embodiment of an SSB transmission method for supporting the analog beamforming and the antenna combination selection method.

FIG. 17 is a conceptual diagram illustrating a fourth exemplary embodiment of an SSB transmission method for supporting the analog beamforming and the antenna combination selection method.

Referring to FIG. 17, since there may be a disadvantage in that an initial access delay is increased when a SSB burst is long, the base station may divide the entire band and transmit different SSBs for each BWP. The base station may divide the entire band occupied by a transmission frame into N_bwp pieces and allocate a different BWP for each transmission beam direction. For example, the base station may divide N_beam transmission beam directions into N_bwp directions, so that each BWP covers (N_beam/N_bwp) transmission beam directions. The base station may transmit N_bwp SSBs through different frequency bands at the same time (i.e., in the same OFDM symbol).

In a fifth exemplary embodiment of the SSB transmission method for supporting the analog beamforming and antenna combination selection method, the base station may expand a system capacity by using polarization. When using polarization, the base station may transmit SSB(s) by considering two different polarizations as different transmission beams.

[Method for Tracking a Position of a Terminal]

The SSB including PSS and SSS for synchronization may perform a radar function. Referring again to FIG. 3, an SSB transmitted by each base station may include a different PSS and SSS for each base station to transmit a physical cell ID (PCI). The base station may utilize the different PSS and SSS for each base station as a radar signal. In addition, the base station may generate a wideband radar signal by transmitting a plurality of SSBs in different subcarriers at the same time.

As a structure of a radar, there may be a monostatic radar structure in which a base station transmitting a radar signal receives a reflected signal, and a bistatic radar structure in which a transmitting node transmitting a radar signal and a receiving node receiving a reflected signal exist at different positions. When a receiving node (e.g., a transmitting base station or a node receiving a reflected signal) receives a plurality of SSBs transmitted from different transmitting nodes (e.g., base stations or nodes transmitting radar signals), since a different SSB is defined for each base station, the plurality of SSBs may be distinguished. In the case of the bistatic radar, the node receiving the reflected signal may identify the position of the terminal by using a signal difference between a LoS path with the radar signal transmitting node and a reflected path reflected by the terminal.

In particular, in communication using aerial vehicles, each of a plurality of base stations may transmit an SSB to an aerial vehicle, and in an initial access process, the areal vehicle may feed back an index of an SSB transmitted by a base station to access from among the SSBs received from the plurality of base stations to the corresponding base station. Accordingly, the base station that has received a plurality of SSBs reflected from the aerial vehicle may identify from which base station and when the SSB received from the aerial vehicle has been transmitted. Therefore, the base station may calculate the position of the aerial vehicle based on the above-described information.

Figure 18:
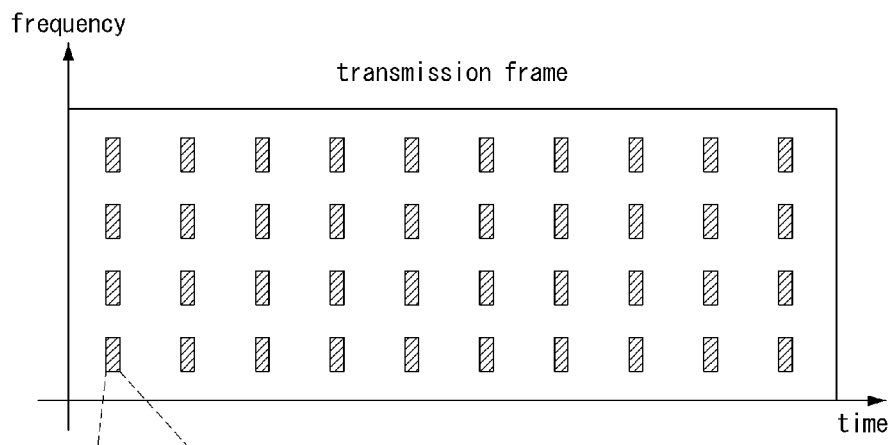
FIG. 18 is a conceptual diagram illustrating an SSB having a modified structure.
Figure 18:
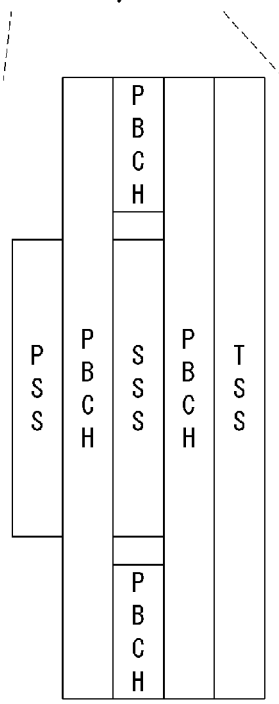

FIG. 18 is a conceptual diagram illustrating an SSB having a modified structure.

Referring to FIG. 18, the base station may modify an SBS structure to assist the radar function. When the base station uses the NR SSB structure of FIG. 3 as it is, the performance of the radar function may be limited. Accordingly, the base station may modify the structures of PSS and SSS, which are synchronization signals, in the SSB. Alternatively, the base station may use an additional synchronization signal (e.g., tertiary synchronization signal (TSS)).

Figure 19A:
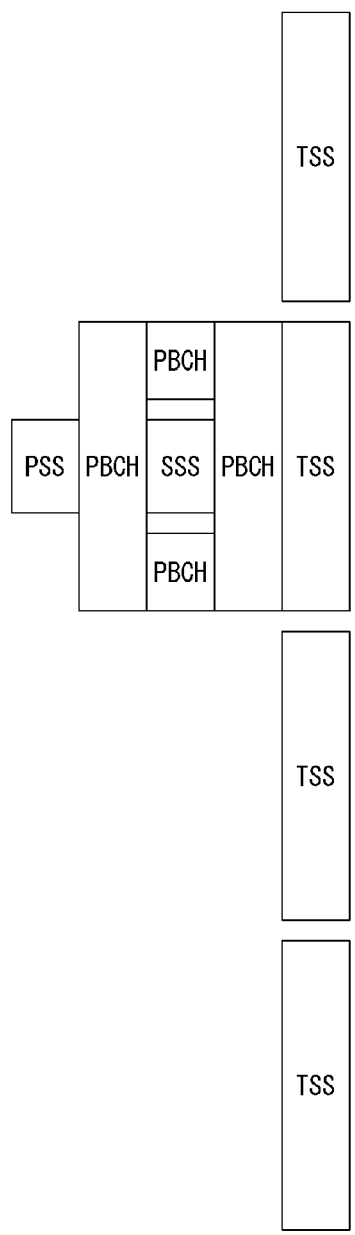
FIG. 19A is a conceptual diagram illustrating a first exemplary embodiment of an SSB including a TSS.
Figure 19B:
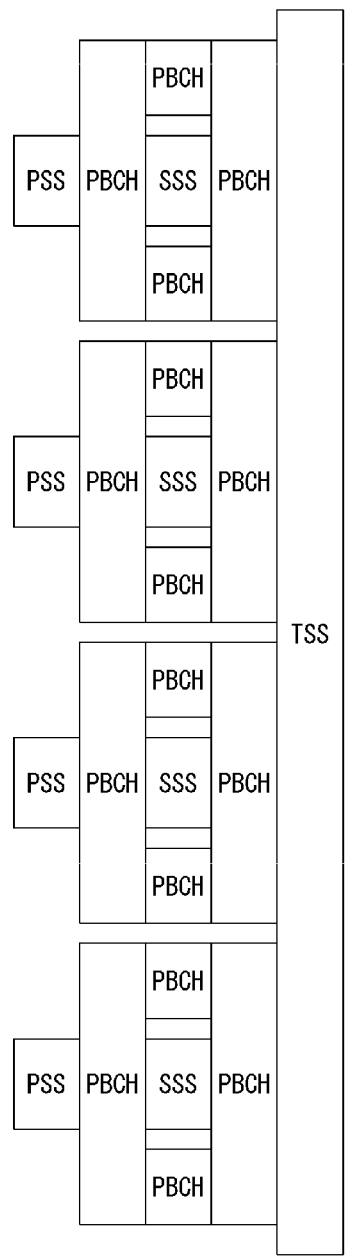
FIG. 19B is a conceptual diagram illustrating a second exemplary embodiment of an SSB including a TSS.

FIG. 19A is a conceptual diagram illustrating a first exemplary embodiment of an SSB including a TSS, and FIG. 19B is a conceptual diagram illustrating a second exemplary embodiment of an SSB including a TSS.

Referring to FIGS. 19A and 19B, since the performance of the radar may depend on a bandwidth of a signal, in the SSB structure modified to improve the radar function, the TSS may occupy a wider bandwidth than the existing SSB structure. Referring again to FIG. 19A, the base station may transmit one existing SSB in the entire band, and may transmit a plurality of TSSs in a wideband. Referring again to FIG. 19B, the base station may transmit a plurality of the existing SSBs and a TSS in the wideband.

The base station may select the additional synchronization signal based on an ambiguity function as shown in Equation 1 below in order to compensate for a signal delay and ensure the Doppler frequency estimation performance.

$$\chi(\tau, f_d) = \int_{-\infty}^{\infty} s(t) s^*(t-\tau) e^{j2\pi f_d t} dt \quad \text{[Equation 1]}$$

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal for initial access in a communication system, the operation method comprising:
receiving a plurality of communication signals having different indexes through a plurality of antennas included in a base station;
calculating a channel capacity using the plurality of communication signals;
feeding back, to the base station, index(es) of one or more communication signals among the plurality of communication signals based on the channel capacity; and
performing communication with the base station through a combination of two or more antennas that have transmitted the one or more communication signals among the plurality of antennas,
wherein the receiving of the plurality of communication signals comprises:
receiving, from the base station, control information for controlling a position of the terminal;
receiving, from the base station, a first communication signal among the plurality of communication signals at a first position moved according to the control information; and
receiving, from the base station, a second communication signal among the plurality of communication signals at a second position moved according to the control information,
wherein the first position is different from the second position.

2. The operation method according to claim 1, wherein when the plurality of communication signals are respectively transmitted through the plurality of antennas, the channel capacity means a capacity of a channel in which a combination of two or more communication signals among the plurality of communication signals is received.

3. The operation method according to claim 1, wherein when the plurality of communication signals are transmitted through a combination of the plurality of antennas, the channel capacity means a capacity of a channel through which each of the plurality of communication signals is received.

4. The operation method according to claim 1, wherein the calculating of the channel capacity comprises, when the plurality of communication signals are transmitted through a combination of the plurality of antennas,
estimating a channel from a first antenna belonging to the combination of the plurality of antennas to the terminal by using a first multi-stream demodulate reference signal (DMRS) transmitted through the first antenna; and
estimating a channel from a second antenna belonging to the combination of the plurality of antennas to the terminal by using a second multi-stream DMRS transmitted through the second antenna,
wherein the first multi-stream DMRS is different from the second multi-stream DMRS.

5. The operation method according to claim 1, wherein the calculating of the channel capacity comprises, when the plurality of communication signals are transmitted through a combination of the plurality of antennas,
estimating a channel from a first antenna belonging to the combination of the plurality of antennas to the terminal by using a first communication signal transmitted in a first frequency band through the first antenna; and
estimating a channel from a second antenna belonging to the combination of the plurality of antennas to the terminal by using a second communication signal transmitted in a second frequency band through the second antenna,
wherein the first frequency band is different from the second frequency band.

6. The operation method according to claim 1, wherein the receiving of the plurality of communication signals comprises:
receiving a first communication signal among the plurality of communication signals through a first bandwidth part (BWP); and
receiving a second communication signal among the plurality of communication signals through a second BWP.

7. An operation method of a base station including a plurality of antennas for initial access in a communication system, the operation method comprising:
transmitting, to a terminal, a plurality of communication signals having different indexes through the plurality of antennas;

receiving, from the terminal, index(es) of one or more communication signals among the plurality of communication signals, the one or more communication signals being selected by the terminal based on a channel capacity calculated using each of the plurality of communication signals; and performing communication with the terminal through a combination of two or more antennas that have transmitted the one or more communication signals among the plurality of antennas, wherein the transmitting of the plurality of communication signals comprises:

transmitting, to the terminal, control information for controlling a position of the terminal, transmitting, to the terminal, a first communication signal among the plurality of communication signals at a first position moved according to the control information; and transmitting, to the terminal, a second communication signal among the plurality of communication signals at a second position moved according to the control information, wherein the first position is different from the second position.

8. The operation method according to claim 7, wherein the plurality of communication signals are respectively transmitted through the plurality of antennas.

9. The operation method according to claim 7, wherein a first communication signal among the plurality of communication signals is transmitted through a first combination of the plurality of antennas, a second communication signal among the plurality of communication signals is transmitted through a second combination of the plurality of antennas, and the first combination and the second combination are configured with different antennas.

10. The operation method according to claim 7, wherein the plurality of antennas are a plurality of virtual antennas, a first communication signal among the plurality of communication signals is transmitted through a first combination of the plurality of virtual antennas, a second communication signal among the plurality of communication signals is transmitted through a second combination of the plurality of virtual antennas, the first combination and the second combination are configured with different virtual antennas, the first communication signal is transmitted using a first beam according to beamforming, and the second communication signal is transmitted using a second beam.

11. The operation method according to claim 7, wherein a first bandwidth part (BWP) is allocated for a first beam according to beamforming, a second BWP is allocated for a second beam, a first communication signal among the plurality of communication signals is transmitted in the first BWP using the first beam, and a second communication signal among the plurality of communication signals is transmitted in the second BWP using the second beam.

12. The operation method according to claim 7, wherein in the transmitting of the plurality of communication signals comprises, when the plurality of communication signals are transmitted through a combination of the plurality of antennas, transmitting a first communication signal including a first multi-stream demodulate reference signal (DMRS) through a first antenna belonging to the combination of the plurality of antennas; and transmitting a second communication signal including a second multi-stream DMRS through a second antenna belonging to the combination of the plurality of antennas, wherein the first multi-stream DMRS is different from the second multi-stream DMRS.

13. The operation method according to claim 7, wherein in the transmitting of the plurality of communication signals comprises, when the plurality of communication signals are transmitted through a combination of the plurality of antennas, transmitting a first communication signal in a first frequency band through a first antenna belonging to the combination of the plurality of antennas; and transmitting a second communication signal in a second frequency band through a second antenna belonging to the combination of the plurality of antennas, wherein the first frequency band is different from the second frequency band.

14. A base station including a plurality of antennas in a communication system, the base station comprising:

a processor;

a memory electronically communicating with the processor; and instructions stored in the memory, wherein when executed by the processor, the instructions cause the base station to:

transmit, to a terminal, a plurality of communication signals having different indexes through the plurality of antennas;

receive, from the terminal, index(es) of one or more communication signals among the plurality of communication signals, the one or more communication signals being selected by the terminal based on a channel capacity calculated using each of the plurality of communication signals; and perform communication with the terminal through a combination of two or more antennas that have transmitted the one or more communication signals among the plurality of antennas, and wherein in the transmitting of the plurality of communication signals, the instructions cause the base station to:

transmit, to the terminal, control information for controlling a position of the terminal, transmit, to the terminal, a first communication signal among the plurality of communication signals at a first position moved according to the control information, and transmit, to the terminal, a second communication signal among the plurality of communication signals at a second position moved according to the control information, wherein the first position is different from the second position.

15. The base station according to claim 14, wherein the plurality of communication signals are respectively transmitted through the plurality of antennas.

16. The base station according to claim 14, wherein a first communication signal among the plurality of communication signals is transmitted through a first combination of the plurality of antennas, a second communication signal among the plurality of communication signals is transmitted through a second combination of the plurality of antennas, and the first combination and the second combination are configured with different antennas.

17. The base station according to claim 14, wherein the plurality of antennas are a plurality of virtual antennas, a first communication signal among the plurality of communication signals is transmitted through a first combination of the plurality of virtual antennas, a second communication signal among the plurality of communication signals is transmitted through a second combination of the plurality of virtual antennas, the first combination and the second combination are configured with different virtual antennas, the first communication signal is transmitted using a first beam according to beamforming, and the second communication signal is transmitted using a second beam.

* * * * *